(12) United States Patent
Robell (10) Patent No.: US 10,315,679 B1
(45) Date of Patent: Jun. 11, 2019

(54) CART RETURN TRACKING SYSTEM

(71) Applicant: Kevin Robell, Kula, HI (US)

(72) Inventor: Kevin Robell, Kula, HI (US)

( * ) Notice: Subject to any disclaimer, the term of this patent is extended or adjusted under 35 U.S.C. 154(b) by 0 days.

(21) Appl. No.: 16/163,413

(22) Filed: Oct. 17, 2018

Related U.S. Application Data (63) Continuation of application No. 16/128,330, filed on Sep. 11, 2018.

(60) Provisional application No. 62/650,048, filed on Mar. 29, 2018.

(51) Int. Cl.
| | | |
|---|---|---|
| *B62B 5/00* | (2006.01) | |
| *G07F 7/06* | (2006.01) | |
| *G06Q 30/02* | (2012.01) | |
| *H04W 4/029* | (2018.01) | |

(52) U.S. Cl.
CPC ....... *B62B 5/0096* (2013.01); *G06Q 30/0208* (2013.01); *G06Q 30/0224* (2013.01); *G07F 7/0618* (2013.01); *H04W 4/029* (2018.02)

(58) Field of Classification Search
CPC .................................................. B62B 5/0096
USPC ....... 235/462.11, 462.1, 375, 494; 340/572.1
See application file for complete search history.

(56) References Cited

U.S. PATENT DOCUMENTS

| | | |
|---|---|---|
| 5,708,782 A | 1/1998 | Larson et al. |
| 6,250,451 B1 | 6/2001 | Thirkill |
| 6,486,768 B1 | 11/2002 | French et al. |
| 6,928,343 B2 | 8/2005 | Cato |
| 6,975,205 B1 | 12/2005 | French et al. |
| 7,218,225 B2 | 5/2007 | Wieth et al. |
| 7,679,522 B2 | 3/2010 | Carpenter |
| 7,714,723 B2 | 5/2010 | Fowler et al. |
| 8,406,993 B2 | 3/2013 | Hannah et al. |
| 8,930,065 B2 | 1/2015 | Argue et al. |
| 8,976,027 B2 | 3/2015 | Lilley |
| 2003/0046154 A1 | 3/2003 | Larson et al. |
| 2006/0163349 A1 | 7/2006 | Neugebauer |
| 2011/0143779 A1 | 6/2011 | Rowe et al. |
| 2013/0187755 A1 | 7/2013 | Rogers et al. |
| 2014/0244207 A1 | 8/2014 | Hicks |

(Continued)

OTHER PUBLICATIONS

Bray, P., "Get Ready for Smartcards and Shopping Carts That Talk to You [Final Edition]," The Gazette, Montreal, Jan. 28, 1995, 3 pages.

(Continued)

*Primary Examiner* — Allyson N Trail
(74) *Attorney, Agent, or Firm* — Christensen O'Connor Johnson Kindness PLLC (57) ABSTRACT

An image of a code on a shopping cart is captured with a mobile computing device having a camera and GPS functionality. The mobile device extracts an identifier associated with the cart from the code and transmits this information to a server, which associates the mobile device with the cart. A user returns the cart to a designated return area while carrying or wearing the mobile computing device. The mobile device sends GPS data to the server, which can determine the starting position, the distance traveled, and whether the designated return area has been reached. The cart code can then be rescanned at the designated return area to confirm that the user has actually moved the cart to the return area, without any special hardware on the cart or in the return area. A computer system may provide a credit, code, coupon, or other incentive to a user account.

19 Claims, 7 Drawing Sheets

(56) References Cited

U.S. PATENT DOCUMENTS

| | | | |
|---|---|---|---|
| 2015/0070170 A1* | 3/2015 | Margalit | G07F 7/0681 |
| | | | 340/572.1 |
| 2015/0205300 A1 | 7/2015 | Caver | |
| 2016/0023675 A1 | 1/2016 | Hannah et al. | |
| 2016/0034924 A1 | 2/2016 | Sorenson | |
| 2016/0328696 A1* | 11/2016 | Todasco | G06Q 20/3224 |
| 2018/0100933 A1* | 4/2018 | Xia | G01S 19/47 |
| 2018/0315011 A1* | 11/2018 | Clarke | G06Q 10/087 |
| 2018/0334216 A1* | 11/2018 | Montez | B62K 21/12 |

OTHER PUBLICATIONS

"Would a Marriage of Mobile and a Shopping Cart Solve the In-Store Tracking Issue?" FierceRetail, Sep. 26, 2012, <http://www.fierceretail.com/story/would-a-marriage-of-mobile-and-a-shopping-cart-solve-the-in-store-tracking-issue [retrieved Mar. 28, 2016], 3 pages.

\* cited by examiner

CART RETURN TRACKING SYSTEM

CROSS-REFERENCE TO RELATED APPLICATION

This application is a continuation of U.S. application Ser. No. 16/128,330, filed Sep. 11, 2018, which claims the benefit of U.S. Provisional Application No. 62/650,048, filed on Mar. 29, 2018, which is incorporated by reference herein.

BACKGROUND

Retail stores often provide wheeled shopping carts to their customers for use while shopping. Customers will often use carts to carry their purchases from the retail store to their car in a parking lot or garage when they are finished shopping. However, customers often do not return carts to designated locations. Abandoned carts that occupy parking spaces or walkways can cause safety hazards or frustration for customers. Furthermore, a parking lot littered with abandoned carts can give an impression of clutter and neglect that may be damaging to the business. Retailers typically combat this problem by assigning employees the task of collecting carts and returning them to a proper location, which carries significant costs in terms of time and labor.

Some attempts have been made to use technology to encourage customers to return carts to proper locations. In one approach, a radio frequency identification (RFID) tag reader located in a cart return area may be used to detect the presence in that area of a cart having an RFID tag, which requires specialized hardware in the cart return area as well as on the cart itself. However, significant technological problems remain.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a server computer system establishes communication with a mobile computing device. The server computer system receives a first cart identifier extracted from a first image and additional information from the mobile computing device. The additional information may include, e.g., device identity information, user identity information, location information, image metadata, or a combination of such information. The server computer system associates the first cart identifier with the mobile computing device in a database. The server computer system transmits a response message to the mobile device. The server computer system receives navigation data (e.g., GPS data) from the mobile computing device and compares this data, or a portion of it, to a stored location of a designated cart return area. The server computer system determines whether the mobile computing device has arrived in the designated cart return area. The step of determining that the mobile computing device has arrived at the cart return area may include obtaining a current location of the mobile computing device from the navigation data; and determining whether the current location is within a bounded area that defines the cart return area. The arrival of the mobile computing device in the cart return area may trigger transmission of an arrival message to the mobile computing device.

The server computer system also may receive a second cart identifier extracted from a second image. In this situation, the server computer system determines whether the first cart identifier matches the second cart identifier. If so, the server computer system transmits a cart return confirmation message to the mobile computing device.

In another aspect, described from the perspective of the mobile computing device, the mobile computing device activates a camera to obtain a first image of a cart code, which may be attached to the cart. The mobile computing device extracts a first cart identifier from the first image and transmits the first cart identifier along with additional information to the server computer system. The mobile computing device receives a response message from the server computer system. The response message may cause events to occur at the mobile computing device, such as an update to a user interface of a cart return tracking application. The mobile computing device transmits navigation data (e.g., GPS data) to the server computer system as the mobile computing device moves towards the cart return area (e.g., while being carried or worn by a user that is returning the cart). On arrival, the mobile computing device receives an arrival message from the server computer system. The arrival message may cause additional events to occur at the mobile computing device, such as an update to the user interface of the cart return tracking application as described in further detail below.

The mobile computing device also may activate the camera to obtain a second image of the cart code. In this situation, the mobile computing device extracts a second cart identifier from the second image and transmits the second cart identifier to the server computer system. The mobile computing device also may transmit second additional information associated with the second cart identifier to the server computer system. The mobile computing device may receive a cart return confirmation message from the server computer system. The cart return confirmation message may cause events to occur at the mobile computing device, such as an update to the user interface of the cart return tracking application.

In any of the described embodiments, additional information transmitted by the mobile computing device may include one or more of device identity information, user identity information, location information, second image metadata, a combination of such information, or other information. The additional information, or portions of it, can be analyzed to provide an additional level of assurance that a cart has actually been returned to the designated return area by the user of the mobile computing device.

In any of the described embodiments, a computer system may modify a user account, (e.g., by providing a credit, code, contest entry, coupon, or other incentive to a user account) upon detection of the return of a cart to a designated cart return area using technology described herein.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

As noted above, some attempts have been made to use technology to encourage customers to return carts to proper locations. In one approach, a radio frequency identification (RFID) tag reader located in a cart return area may be used to detect the presence in that area of a cart having an RFID tag. Once detected, a shopper can be given points or credits for returning the cart. This prior approach provides no ability to track where the cart came from. In this prior approach, the limitations of the technology dictate that return of a cart from a far corner of a crowded parking lot is no different than simply placing the cart in the return area as the customer leaves the store, even though the former case requires significantly more effort on the part of the customer. In addition, this prior approach requires specialized hardware in the cart return area as well as on the cart itself. Therefore, significant technological problems remain.

The present disclosure describes technical solutions to technological problems described above, among other potential benefits. In one illustrative scenario, a user captures an image of a code on a shopping cart with a mobile computing device having a camera and GPS functionality. The code can be displayed on a label or placard attached to the cart. The mobile computing device reads this code, extracts an identifier associated with the cart from the code, and transmits this information to a server, which associates the mobile computing device with the cart. The user then returns the cart to a designated return area while carrying or wearing the mobile computing device. The mobile computing device sends GPS data to the server, which can determine the starting position, the distance traveled, and whether the designated return area has been reached. The cart code can then be rescanned at the designated return area. This event can be used to confirm that the user has actually moved the cart to the return area, without the use of any special electronic hardware on the cart or in the return area itself. Therefore, in addition to providing a technical solution to the technological problem of tracking starting location and distance traveled by the cart, the present disclosure removes the need for specialized hardware at a cart return area to detect the return of a cart.

In any of the described embodiments, a computer system may modify a user account (e.g., by providing a credit, code, coupon, contest entry, or other incentive to a user account) upon detection of the return of a cart to a designated cart return area using technology described herein. With such technological solutions in place, a customer can receive credit for successfully returning a cart, and such credit can be adjusted based on factors such as distance traveled to return the cart. To prevent fraud or abuse, a computer system under the control of a retailer can track users and returned carts and enforce restrictions (e.g., 1 cart per user per day, 5 carts per user per day, or other limitations on time frame, number of carts, maximum distance, etc.). Such restrictions and other parameters can be set or adjusted via settings in a back-end computer system.

Figure 1:
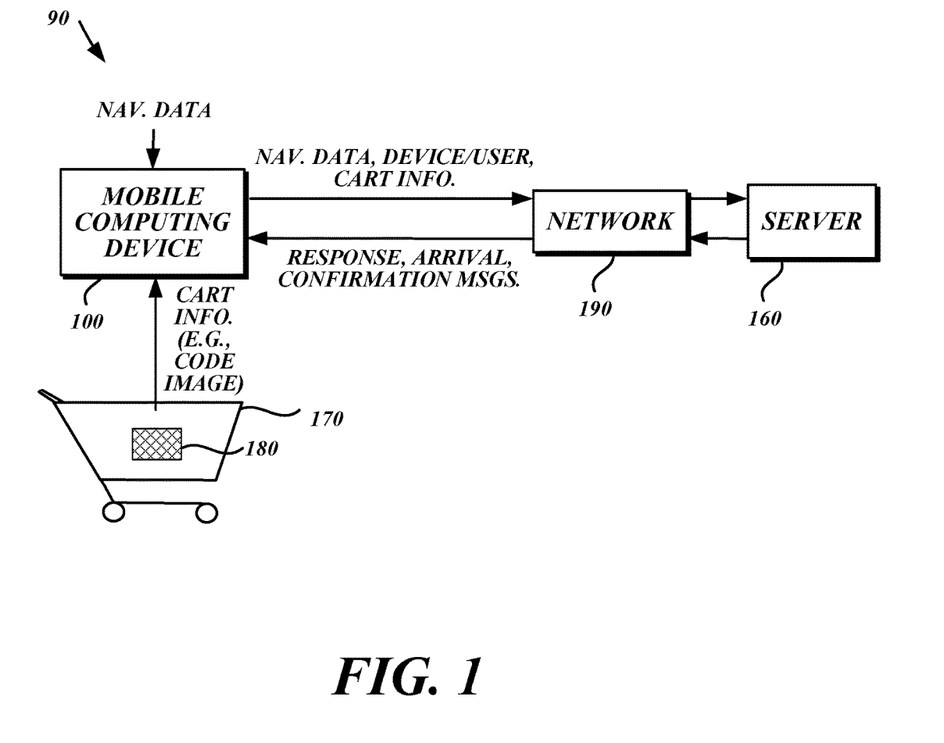
FIG. 1 is a diagram of an illustrative shopping cart return tracking system in accordance with various aspects of the present disclosure.

FIG. 1 is a diagram of an illustrative shopping cart return tracking system 90 in accordance with various aspects of the present disclosure. In the example shown in FIG. 1, a mobile computing device 100 (e.g., a smart phone or tablet computer) communicates with a cart return tracking server 160 via a network 190 (e.g., WiFi, cellular, or satellite network). The mobile computing device 100 obtains cart information (e.g., a unique identifying code for the cart) from a shopping cart 170. In one possible scenario, the mobile computing device 100 includes a digital camera (not shown) and captures an image of a graphical code 180 (e.g., QR code, bar code) on the cart 170 (e.g., from a label or placard attached to the cart) using the camera. The captured image can then be analyzed by a suitable code reader (e.g., a QR code reader application or bar code reader application) to extract the cart information encoded therein.

The amount of information that may be extracted from the captured image may depend on factors such as the type of code being used. With respect to QR codes, the amount of text information provided by the code may vary based on, e.g., the dimensions/resolution of the QR code, the number of bits per character, error correction level, etc. In an embodiment, black and white QR codes are used. Alternatively, other types of codes such as color QR codes can be used.

The code reader may be implemented in software running on the mobile computing device 100. Or, the image can be transmitted to another device (e.g., the cart return tracking server 160) with a suitable code reader. Alternatively, the mobile computing device 100 obtains cart information from the cart in some other way.

In one illustrative scenario, the mobile computing device 100 establishes communication with the cart return tracking server 160 before capturing the image of the cart code. For example, the mobile computing device 100 may establish communication with the cart return tracking server 160 in response to launching a cart return tracking application stored on the device, or in response to navigating to a URL associated with the server via a web browser. Alternatively, the mobile computing device 100 may establish communication with the cart return tracking server 160 after capturing the image of the cart code. For example, the cart code may include an encoded URL associated with the server 160, or encoded instructions to download (e.g., from an application marketplace) a cart return tracking application that allows the mobile computing device to establish communication with the server. In this scenario, after capturing the image, the code reader may cause the mobile computing device to navigate to the URL or download the application.

Cart identifiers can be assigned to carts in a variety of ways. In one possible approach, a cart identifier is unique for each given location. In a second approach, a cart identifier can be unique across a larger number of locations, which would allow carts to be tracked across multiple locations, or even multiple retailers or organizations. In this second approach, carts also can be moved and shared between locations, without duplicating codes.

Referring again to the example shown in FIG. 1, the mobile computing device also obtains navigation data (e.g., GPS data). As described in further detail below with reference to FIGS. 2 and 3, the mobile computing device 100 may include a navigation data receiver, such as a GPS receiver, that allows the mobile computing device to obtain the navigation data. The navigation data is useful, for example, for tracking the route taken and distance traveled by a user carrying or wearing the mobile computing device 100 as she returns the cart 170 to a return area.

In the example shown in FIG. 1, the mobile computing device 100 transmits navigation information, cart information (e.g., a cart ID decoded from an image of a QR code or bar code), and device information (e.g., a device ID, a user ID for a user of the device) to a server computing device (e.g., cart return tracking server 160) via the network 190. The cart return tracking server 160 receives this information and may provide a response to the mobile computing device 100 indicating that the information has been received by the server, as described in further detail below.

The cart return tracking server 160 uses the cart information and the device information to associate (e.g., in a database) the mobile computing device 100 and the cart 170. The cart return tracking server 160 uses the navigation information to determine whether the cart has been returned to a return area and to track the route taken and distance traveled by a user carrying or wearing the mobile computing device 100 as she returns the cart 170 to the return area. Illustrative processes that may be performed by the mobile computing device 100 and the cart return tracking server 160 in this context are described in further detail below.

Figure 2:
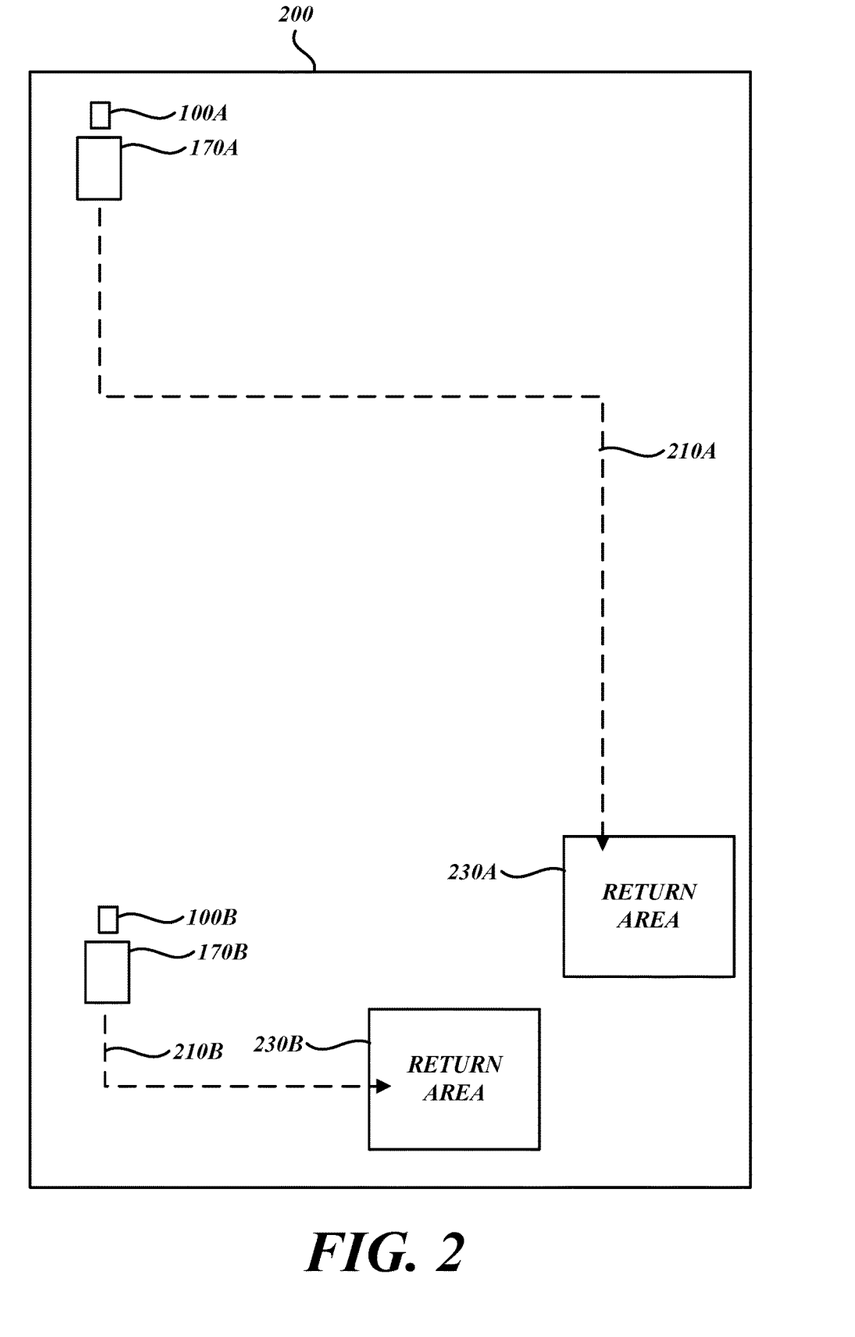
FIG. 2 is a diagram of an illustrative usage scenario for a shopping cart return tracking system in accordance with various aspects of the present disclosure.

FIG. 2 is a diagram of an illustrative usage scenario for a shopping cart return tracking system in accordance with various aspects of the present disclosure. In the example shown in FIG. 2, multiple mobile computing devices and shopping carts are associated and tracked as they are returned from different locations to return areas. (Although only two mobile shopping devices, carts, and return areas are shown in FIG. 2 for ease of illustration, it should be understood that the shopping cart return tracking system can be designed to track many more mobile computing devices, carts, and return areas.) As shown in FIG. 2, a mobile computing device 100A is associated with a cart 170A in an area 200, such as a parking lot of a retail store. The mobile computing device 100A and the cart 170A follow a route 210A to a designated return area 230A. The mobile computing device 100A transmits navigation information corresponding to the route 210A to a server, such as the cart return tracking server 160 shown in FIG. 1. The server tracks the cart 170A's return to the return area 230A, such as by tracking the route followed and/or distance traveled based on navigation data received from the mobile computing device 100A, and comparing the updated location with the location of the return area, which may be stored in a database on the server. Similarly, a mobile computing device 100B is associated with a cart 170B in the same area 200. The mobile computing device 100B and the cart 170B follow a route 210B to a designated return area 230B. The mobile computing device 100B transmits navigation information corresponding to the route 210B to the server, which tracks the cart 170B's return to the return area 230B, although the cart 170B could also be returned to the return area 230A or some other designated return area.

FIG. 2 illustrates how carts in different locations may need to travel different routes and distances in order to be returned to a designated return area. These factors can be taken into account when determining further action to take by the server (such as crediting an account in different amounts for returning the cart from different distances or locations). For example, the return of a cart located 100 meters from the nearest designated return area may result in a greater credit than the return of a cart located 50 meters from the nearest designated return area. Determining the nearest designated return area may be useful, for example, to prevent users from obtaining extra credit by intentionally returning a cart to a more distant return area.

Figure 3:
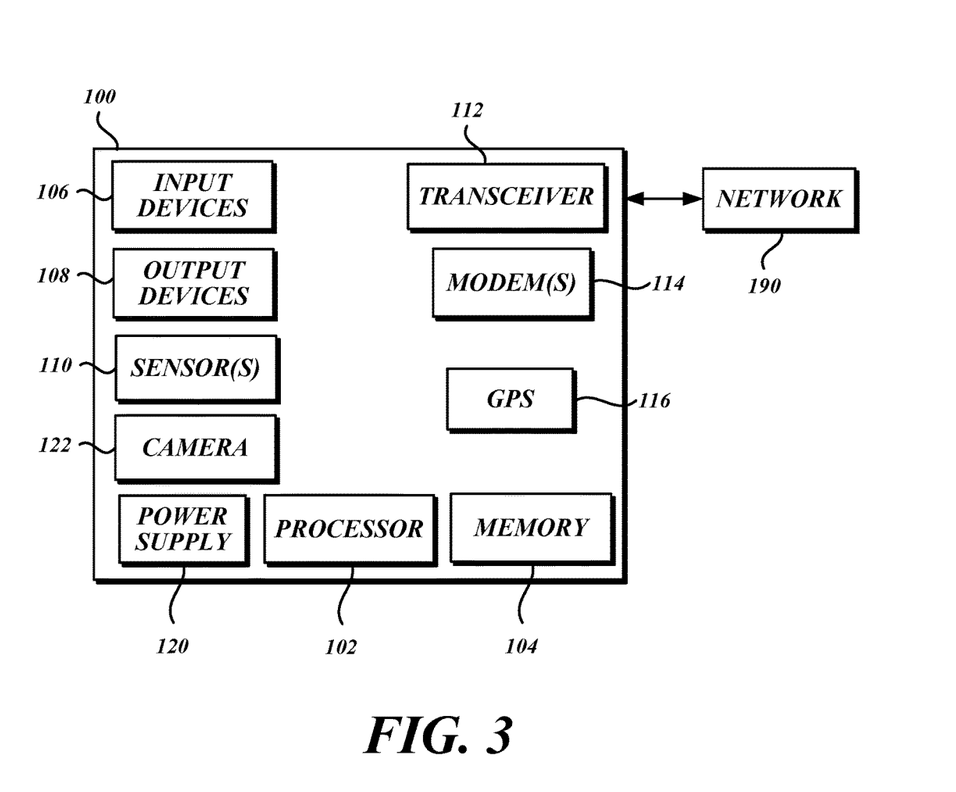
FIG. 3 is a block diagram of an illustrative mobile computing device that can be used in accordance with various aspects of the present disclosure.

FIG. 3 is a block diagram of an illustrative mobile computing device 100 that can be used in a shopping cart return tracking system (e.g., the system 90 depicted in FIG. 1) in accordance with various aspects of the present disclosure. The components depicted in the illustrative mobile computing device 100 are not exhaustive; many components that may be included in the illustrative mobile computing device 100 are not shown for ease of illustration.

In the example shown in FIG. 1, the mobile computing device 100 (e.g., a smart phone or tablet computer) is configured for wireless two-way communication with other computing devices via one or more communication networks (e.g., the communication network 190) in a shopping cart return tracking system in accordance with various aspects of the present disclosure. The mobile computing device 100 includes at least one processor 102 (e.g., a single or multi-core processor in a system-on-chip (SoC) design, or other processing circuitry) for performing functions. In a typical smart phone or tablet computer design, the mobile computing device 100 executes an operating system to control hardware components of the mobile computing device and provide support for application programs, such as a web browser or a dedicated application provided for the purpose of implementing embodiments described herein. The mobile computing device 100 includes memory 104, which may include non-removable memory, such as memory that may be included along with the processor 102 in a SoC design, or other non-removable forms of memory. Memory 104 also may include removable memory such as flash memory (e.g., in the form of a microSD card), a subscriber identity module (SIM) card, or other memory storage devices. The memory 104 can be used for storing data (e.g., application data, user data, device data, GPS data), running the operating system, running applications (e.g., cart return tracking application, camera application, code reader application), or other functions. A power supply 120 (e.g., a rechargeable battery) provides power to the mobile computing device 100 and its components.

For input and output, the mobile computing device 100 includes one or more input devices 106 (e.g., touchscreen, microphone, hardware buttons) and one or more output devices 108 (e.g., speaker, display (which may be provided as a touchscreen), haptic output devices). Although these devices are shown separately in FIG. 3 for ease of illustration, input and output functionality may be combined in a single input/output device, such as a touchscreen. The mobile computing device 100 also includes a camera 122 that can be used to obtain digital images for further processing, as described in further detail below.

In addition to devices mentioned above that may include sensors, such as a touchscreen or camera, the mobile computing device 100 also may include one or more additional sensors 110 to obtain information about the orientation and motion of the mobile computing device (e.g., accelerometers, gyroscopes), information about the environment in which the mobile computing device is located (e.g., ambient light sensors, proximity sensors), or other information.

For communication, the mobile computing device includes a transceiver 112 that transmits and receives signals (e.g., digital or analog signals). One or more modems 114 can be coupled to the transceiver, which can transmit signals via one or more antennas (not shown) to support wireless communication between the mobile computing device 100 and external devices (e.g., via the network 190 or point-to-point communication protocols such as Bluetooth). Components that may be used to physically connect the mobile computing device to other devices (e.g., universal serial bus (USB) ports, dock connectors, audio jacks, or other physical connectors) for communication, power, additional input/output functionality, or other purposes also may be included but are not shown for ease of illustration.

The mobile computing device 100 can determine its location based upon information transmitted from satellites and received by a navigation data receiver, such as a GPS receiver 116. To track movement, location data can be updated over time. The mobile computing device 100 also may determine its location by other means, either separately or in combination with information obtained from the navigation data receiver. For example, location can be determined (e.g., by triangulation) based on known locations of cell sites/towers of a cellular network or WiFi access points. The type, precision, and frequency of updates of location data can vary depending on factors such as the capabilities of the device or navigation system, location of the device (e.g., whether GPS or other signals can be detected by the device in its current location), user preferences, and overall system design.

Location data can be used by applications running on the mobile computing device. Location data also can be transmitted to other devices for storage or further processing. In examples described herein, location data is used to track a user's movements as they return a shopping cart to a designated return location. Location data (e.g., geotags) also can be used to track where images are captured and therefore can be used to determine where a user was located when she captured a code image. This can help to avoid situations where a user attempts to claim credit for returning a cart by taking two pictures of a cart code at the same location and then walking to the cart return area without the cart.

Figure 4:
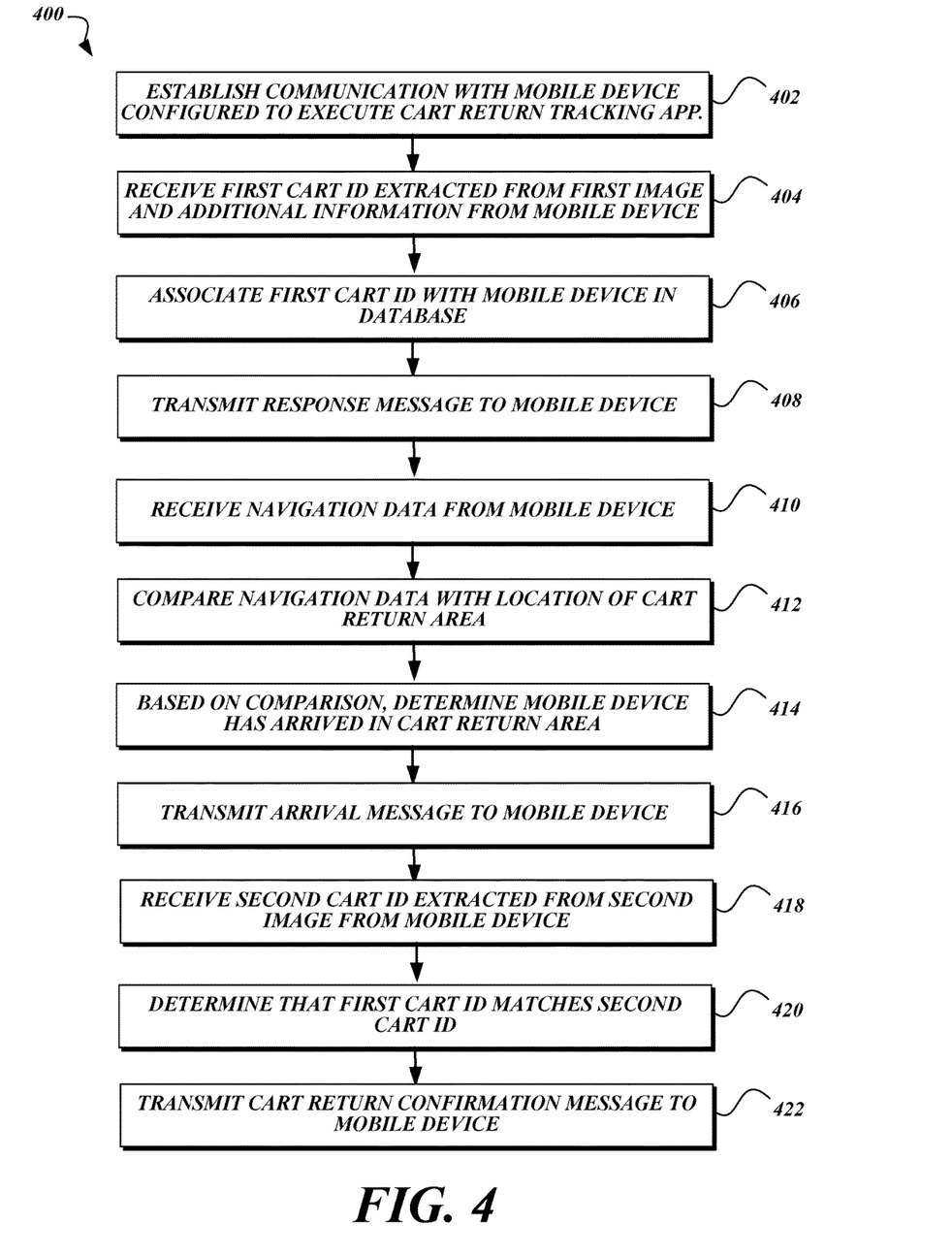
FIG. 4 is a flow chart of an illustrative process performed by a server computing device in accordance with various aspects of the present disclosure.

FIG. 4 is a flow chart of an illustrative process 400 in an illustrative usage scenario from the perspective of a server computer system in communication with a mobile computing device such as device 100. At step 402, the server computer system establishes communication (e.g., via a wireless communication protocol) with a mobile computing device executing a cart return tracking application. For example, the server computer system establishes communication with the mobile computing device in response to a request transmitted by the mobile computing device to the server via the cart return tracking application. At step 404, the server receives a first cart identifier extracted from a first image and additional information from the mobile computing device. The additional information may include, e.g., device identity information, user identity information, location information, image metadata, or a combination of such information. At step 406, the server computer system associates the first cart identifier with the mobile computing device in a database. At step 408, the server computer system transmits a response message to the mobile device. In this way, the server computer system can inform the mobile computing device that the server computer system is tracking the cart return process and is ready to receive additional information from the mobile computing device.

At step 410, the server computer system receives navigation data (e.g., GPS data) from the mobile computing device. At step 412, the server computer system compares this data, or a portion of it, to a stored location of a designated cart return area, and at step 414, the server computer system determines that the mobile computing device has arrived in the designated cart return area. For example, the server computer system may obtain a current location of the mobile computing device from the navigation data and determine whether the current location is within a bounded area that defines the cart return area (see, e.g., FIG. 2). At step 416, the arrival of the mobile computing device in the cart return area triggers transmission of an arrival message to the mobile computing device. At step 418, the server computer system receives a second cart identifier extracted from a second image. At step 420, the server computer system determines whether the first cart identifier matches the second cart identifier. If so, the server computer system transmits a cart return confirmation message to the mobile computing device at step 422.

Figure 5:
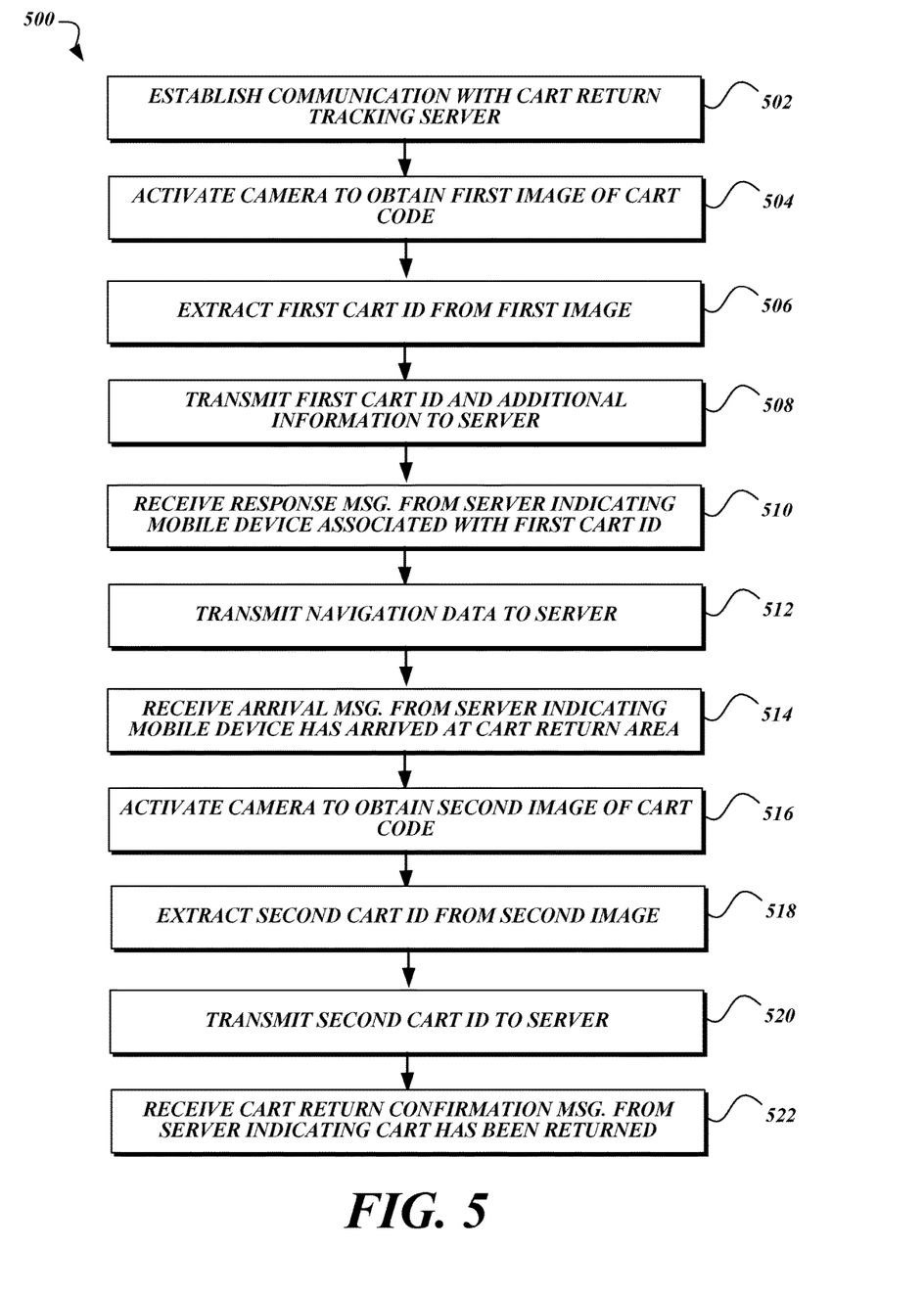
FIG. 5 is a flow chart of an illustrative process performed by a client mobile computing device in accordance with various aspects of the present disclosure.

FIG. 5 is a flow chart of an illustrative process 500 in an illustrative usage scenario from the perspective of the mobile computing device. At step 502, the mobile computing device establishes communication (e.g., via a wireless communication protocol) with the server computer system. At step 504, the mobile computing device activates a camera (e.g., camera 122) to obtain a first image of a cart code, which may be attached to the cart. The mobile computing device extracts a first cart identifier from the first image at step 506, and transmits the first cart identifier along with additional information to the server computer system at step 508. As mentioned above, the additional information may include, e.g., device identity information, user identity information, location information, image metadata, or a combination of such information that may be stored in or obtained by the mobile computing device. At step 510, the mobile computing device receives a response message from the server computer system. The response message may cause events to occur at the mobile computing device, such as an update to a user interface of the cart return tracking application.

At step 512, the mobile computing device transmits navigation data (e.g., GPS data) to the server computer system as the mobile computing device moves towards the cart return area (e.g., while being carried or worn by a user that is returning the cart). At step 514, the mobile computing device receives an arrival message from the server computer system. The arrival message may cause additional events to occur at the mobile computing device, such as an update to the user interface of the cart return tracking application as described in further detail below. At step 516, the mobile computing device activates the camera to obtain a second image of the cart code. The mobile computing device extracts a second cart identifier from the second image at step 518, and transmits the second cart identifier to the server computer system at step 520. The mobile computing device receives a cart return confirmation message from the server computer system at step 522. The cart return confirmation message may cause events to occur at the mobile computing device, such as an update to the user interface of the cart return tracking application. An illustrative user interface is described in further detail below with reference to FIGS. 6A-6C.

Various alternatives to the processes described herein are possible. For example, the mobile computing device may transmit second additional information associated with the second cart identifier to the server computer system. The second additional information may include one or more of device identity information, user identity information, location information, second image metadata, or a combination of such information. This second additional information, or portions of it, can be compared with corresponding portions of the first additional information to provide an additional level of assurance that the cart has actually been returned to the designated return area by the user of the mobile computing device.

The first additional information and second additional information may be obtained, for example, from image metadata. For example, the EXIF (exchangeable image file) format or other metadata formats can be used to store information such as timestamps, camera type, software type, location data, and the like. Image metadata may be stored in digital image files on the mobile computing device or in some other format or location. Such image metadata may be generated and stored when an image is captured or at some other time.

Figure 6A:
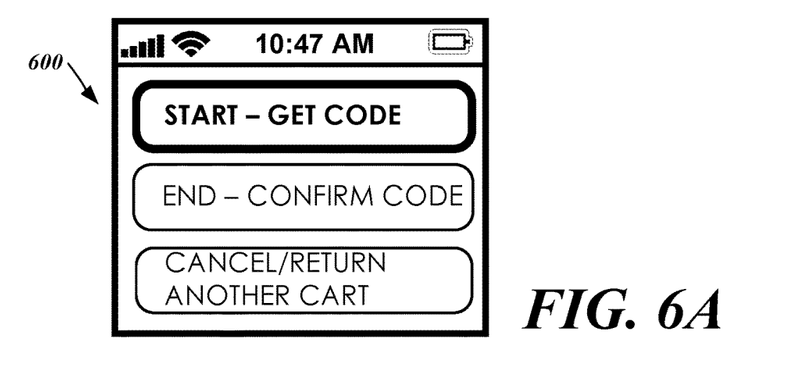
FIGS. 6A, 6B, and 6C show illustrative screen shots of a user interface for a client mobile computing device in accordance with various aspects of the present disclosure.
Figure 6B:
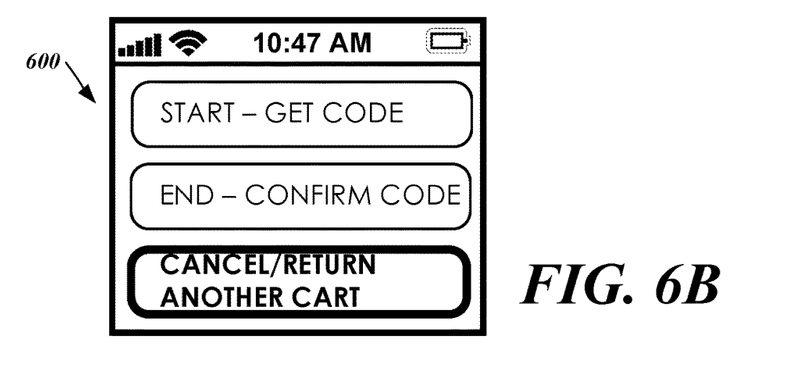
Figure 6C:
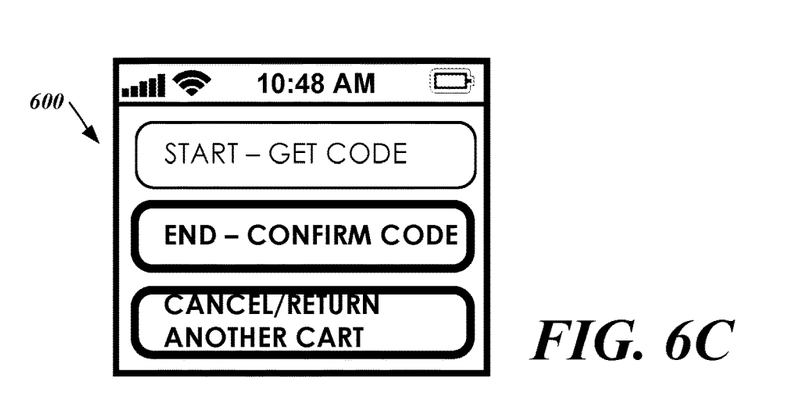

FIGS. 6A, 6B, and 6C depict features of an illustrative user interface for a touchscreen of a mobile computing device that can be used in combination with processes and systems described herein. For example, the user interface depicted in FIGS. 6A, 6B, and 6C can be presented (e.g., via a custom cart return tracking application or a web browser) on a display of the mobile computing device 100 (e.g., a smart phone with GPS functionality).

In the example shown in FIG. 6A, the user interface 600 includes software buttons labeled "START—GET CODE"; "END—CONFIRM CODE"; and "CANCEL/RETURN ANOTHER CART." In an illustrative usage scenario, a user with a cart to return launches a cart return tracking application on her mobile computing device, which displays the software buttons. Once the cart return tracking application has been launched, the user interface 600 may highlight the "START" button highlighted in FIG. 6A, to indicate that it is active. Other buttons, such as the "END" and "CANCEL" buttons shown in FIG. 6A, may be displayed but not highlighted to indicate that they are not active in this state. From this state, upon detecting that the "START" button has been tapped (e.g., by detecting a touch on a touchscreen at a particular location), the mobile computing device may launch a camera application (or a code reader application with image capture functionality) to allow the user to capture an image of the cart code. Upon detecting the capture of an image, the mobile computing device may use a code reader to analyze the image and extract a cart identifier from the code, as described above. The mobile computing device may then transmit the extracted cart identifier and other information (e.g., device ID, user ID) to a server, which may associate the user with the cart, as described above.

Upon receiving a response from the server, the user interface may then proceed with the cart return tracking process, with the location of the mobile computing device being tracked as described above. This process may involve activating additional buttons in the user interface 600, such as the "CANCEL" button highlighted in FIG. 6B. From this state, upon detecting that the "CANCEL" button has been tapped, the mobile computing device may cancel the cart return tracking process and return to the state shown in FIG. 6A, which may allow the user to start again when ready (e.g., with the same cart or with a different cart), or exit the application. Otherwise, the location of the mobile computing device may be tracked as described above.

Upon receiving an indication from the server that a designated return area has been reached, the user interface 600 may activate additional buttons, such as the "END" button highlighted in FIG. 6C. Upon detecting that the "END" button has been tapped (e.g., by detecting a touch on a touchscreen at a particular location), the mobile computing device may launch a camera application (or a code reader application with image capture functionality) to allow the user to capture another image of the cart code in the designated return area. Upon detecting the capture of an image, the mobile computing device may use a code reader to analyze the image and extract a cart identifier from the code, as described above. The mobile computing device may then transmit the extracted cart identifier and other information (e.g., device ID, user ID, updated location) to the server, which may confirm that the cart ID is valid, is in a proper location, and matches the cart ID identified at the start of the cart return tracking process.

Illustrative Operating Environments

In any of the described examples, a data store contains data as described herein and may be hosted, for example, by a database management system (DBMS) to allow a high level of data throughput between the data store and other components of a described system. The DBMS may also allow the data store to be reliably backed up and to maintain a high level of availability. For example, a data store may be accessed by other system components via a network, such as a private network in the vicinity of the system, a secured transmission channel over the public Internet, a combination of private and public networks, and the like. Instead of or in addition to a DBMS, a data store may include structured data stored as files in a traditional file system. Data stores may reside on computing devices that are part of or separate from components of systems described herein. Separate data stores may be combined into a single data store, or a single data store may be split into two or more separate data stores.

Some of the functionality described herein may be implemented in the context of a client-server relationship. In this context, server devices may include suitable computing devices configured to provide information and/or services described herein. Server devices may include any suitable computing devices, such as dedicated server devices. Server functionality provided by server devices may, in some cases, be provided by software (e.g., virtualized computing instances or application objects) executing on a computing device that is not a dedicated server device. The term "client" can be used to refer to a computing device that obtains information and/or accesses services provided by a server over a communication link.

Figure 7:
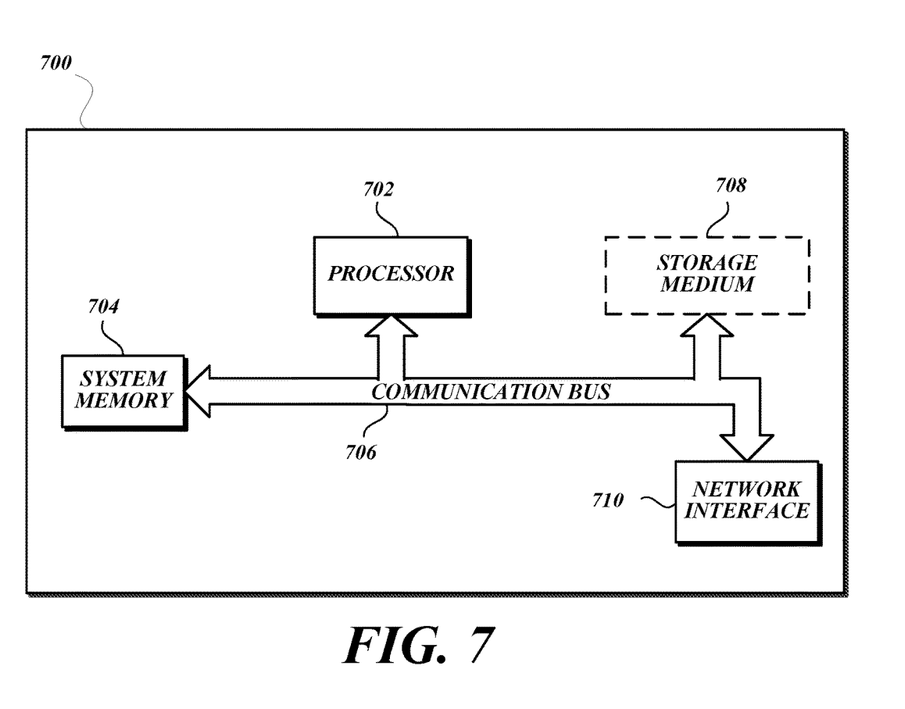
FIG. 7 is a block diagram of a computing device that can be used in accordance with various aspects of the present disclosure.

FIG. 7 is a block diagram that illustrates aspects of an illustrative computing device 700 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 700 includes at least one processor 702 and a system memory 704 connected by a communication bus 706. Depending on the exact configuration and type of device, the system memory 704 may be volatile or nonvolatile memory, such as read only memory ("ROM"), random access memory ("RAM"), EEPROM, flash memory, or other memory technology. Those of ordinary skill in the art and others will recognize that system memory 704 typically stores data and/or program modules that are immediately accessible to and/or currently being operated on by the processor 702. In this regard, the processor 702 may serve as a computational center of the computing device 700 by supporting the execution of instructions.

As further illustrated in FIG. 7, the computing device 700 may include a network interface 710 comprising one or more components for communicating with other devices over a network. Embodiments of the present disclosure may access basic services that utilize the network interface 710 to perform communications using common network protocols. The network interface 710 may also include a wireless network interface configured to communicate via one or more wireless communication protocols, such as WiFi, 2G, 3G, 4G, LTE, WiMAX, Bluetooth, and/or the like.

In FIG. 7, the computing device 700 also includes a storage medium 708. However, services may be accessed using a computing device that does not include means for persisting data to a local storage medium. Therefore, the storage medium 708 depicted in FIG. 7 is optional. In any event, the storage medium 708 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like.

As used herein, the term "computer-readable medium" includes volatile and nonvolatile and removable and nonremovable media implemented in any method or technology capable of storing information, such as computer-readable instructions, data structures, program modules, or other data. In this regard, the system memory 704 and storage medium 708 depicted in FIG. 7 are examples of computer-readable media.

For ease of illustration and because it is not important for an understanding of the claimed subject matter, FIG. 7 does not show some of the typical components of many computing devices. In this regard, the computing device 700 may include input devices, such as a keyboard, keypad, mouse, trackball, microphone, video camera, touchpad, touchscreen, electronic pen, stylus, and/or the like. Such input devices may be coupled to the computing device 700 by wired or wireless connections including RF, infrared, serial, parallel, Bluetooth, USB, or other suitable connection protocols using wireless or physical connections.

In any of the described examples, input data can be captured by input devices and processed, transmitted, or stored (e.g., for future processing). The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 700 (e.g., a client device), or can be integral components of the computing device 700. In some embodiments, multiple input devices may be combined into a single, multifunction input device (e.g., a video camera with an integrated microphone). The computing device 700 may also include output devices such as a display, speakers, printer, etc. The output devices may include video output devices such as a display or touchscreen. The output devices also may include audio output devices such as external speakers or earphones. The output devices can be separate from and communicatively coupled to the computing device 700, or can be integral components of the computing device 700. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Extensions and Alternatives

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

Many alternatives to the user interfaces described herein are possible. In practice, the user interfaces described herein may be implemented as separate user interfaces or as different states of the same user interface, and the different states can be presented in response to different events, e.g., user input events. The user interfaces can be customized for different devices, input and output capabilities, and the like. For example, the user interfaces can be presented in different ways depending on display size, display orientation, etc. The information and user interface elements shown in the user interfaces can be modified, supplemented, or replaced with other elements in various possible implementations. For example, various combinations of graphical user interface elements including text boxes, sliders, drop-down menus, radio buttons, soft buttons, etc., or any other user interface elements, including hardware elements such as buttons, switches, scroll wheels, microphones, cameras, etc., may be used to accept user input in various forms. As another example, the user interface elements that are used in a particular implementation or configuration may depend on whether a device has particular input and/or output capabilities (e.g., a touchscreen). Information and user interface elements can be presented in different spatial, logical, and temporal arrangements in various possible implementations. For example, information or user interface elements depicted as being presented simultaneously on a single page or tab may also be presented at different times, on different pages or tabs, etc. As another example, some information or user interface elements may be presented conditionally depending on previous input, user preferences, or the like.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A server computer system comprising:
   processing circuitry;
   a network interface; and
   memory having stored therein a location of a cart return area and executable instructions configured to cause the server computer system to:
   establish communication with a mobile computing device configured to execute a cart return tracking application;
   receive, from the mobile computing device, a first cart identifier extracted from a first image and first additional information;
   associate the first cart identifier with the mobile computing device in a database;
   transmit, to the mobile computing device, a response message;
   receive navigation data from the mobile computing device;
   perform a comparison of at least a portion of the navigation data with the location of the cart return area; and
   based on the comparison, determine that the mobile computing device has arrived at the cart return area.

2. The server computer system of claim 1, wherein the executable instructions are further configured to cause the server computer system to transmit, to the mobile computing device, an arrival message indicating that the mobile computing device has arrived at the cart return area.

3. The server computer system of claim 1, wherein the first additional information comprises one or more of the mobile computing device identity information, user identity information, first location information, and first image metadata.

4. The server computer system claim 3, wherein the executable instructions are further configured to cause the server computer system to:
   receive, from the mobile computing device, a second cart identifier extracted from a second image;
   determine that the first cart identifier matches the second cart identifier; and
   transmit, to the mobile computing device, a cart return confirmation message indicating that a cart has been returned to the cart return area.

5. The server computing device of claim 4, wherein the executable instructions are further configured to cause the server computer system to receive second additional information associated with the second cart identifier, wherein the second additional information comprises one or more of the device identity information, the user identity information, second location information, and second image metadata.

6. The server computer system of claim 1, wherein the executable instructions are further configured to cause the server computer system to modify a user account in response to returning the cart to the cart return area.

7. The server computer system of claim 1, wherein the step of determining that the mobile computing device has arrived at the cart return area comprises:
   obtaining a current location of the mobile computing device from the navigation data; and
   determining whether the current location is within a bounded area that defines the cart return area.

8. A computer-implemented method comprising, by a computer system:
   establishing communication with a mobile computing device configured to execute a cart return tracking application;
   receiving, from the mobile computing device, a first cart identifier extracted from a first image and first additional information;
   associating the first cart identifier with the mobile computing device in a database;
   transmitting, to the mobile computing device, a response message;
   receiving navigation data from the mobile computing device;

performing a comparison of at least a portion of the navigation data with the location of the cart return area; and based on the comparison, determining that the mobile computing device has arrived at the cart return area.

9. The method of claim 8 further comprising transmitting, to the mobile computing device, an arrival message indicating that the mobile computing device has arrived at the cart return area.

10. The method of claim 8, wherein the first additional information comprises one or more of the mobile computing device identity information, user identity information, first location information, and first image metadata.

11. The method of claim 10 further comprising:
receiving, from the mobile computing device, a second cart identifier extracted from a second image;
determining that the first cart identifier matches the second cart identifier; and
transmitting, to the mobile computing device, a cart return confirmation message indicating that a cart has been returned to the cart return area.

12. The method of claim 11 further comprising receiving second additional information associated with the second cart identifier, wherein the second additional information comprises one or more of the device identity information, the user identity information, second location information, and second image metadata.

13. The method of claim 8 further comprising:
determining that the cart has been returned to the cart return area; and
modifying a user account in response to determining that the cart has been returned to the cart return area.

14. The method of claim 8, wherein the step of determining that the mobile computing device has arrived at the cart return area comprises:
obtaining a current location of the mobile computing device from the navigation data; and
determining whether the current location is within a bounded area that defines the cart return area.

15. A mobile computing device comprising:
processing circuitry;
a wireless communication transceiver;
a camera;
a navigation data receiver; and
memory having stored therein device identity information and executable instructions configured to cause the mobile computing device to:

establish wireless communication with a cart return tracking server;
activate the camera to obtain a first image of a cart code;
extract a first cart identifier from the first image of the cart code;
transmit the first cart identifier and first additional information to the cart return tracking server;
receive a response message from the cart return tracking server;
transmit navigation data to the cart return tracking server; and
receive an arrival message from the cart return tracking server indicating that the mobile computing device has arrived at a designated cart return area.

16. The mobile computing device of claim 15, wherein the first additional information comprises one or more of the mobile computing device identity information, user identity information, first location information, and first image metadata.

17. The mobile computing device of claim 16, wherein the executable instructions are further configured to cause the mobile computing device to:
activate the camera to obtain a second image of the cart code;
extract a second cart identifier from the second image of the cart code; and
transmit the second cart identifier to the cart return tracking server.

18. The mobile computing device of claim 17, wherein the executable instructions are further configured to cause the mobile computing device to:
receive a cart return confirmation message from the cart return tracking server indicating that a cart has been returned to the designated cart return area.

19. The mobile computing device of claim 17, wherein the executable instructions are further configured to cause the mobile computing device to transmit second additional information associated with the second cart identifier, wherein the second additional information comprises one or more of device identity information, user identity information, second location information, and second image metadata.

* * * * *